US009698626B2

(12) United States Patent
Ise et al.

(10) Patent No.: US 9,698,626 B2
(45) Date of Patent: Jul. 4, 2017

(54) REQUEST CONTROL DEVICE, REQUEST CONTROL METHOD, AND COMPUTER PROGRAM PRODUCT FOR CONTROLLING ELECTRONIC USAGE

(71) Applicant: KABUSHIKI KAISHA TOSHIBA, Tokyo (JP)

(72) Inventors: Kotaro Ise, Kawasaki (JP); Yu Kaneko, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 419 days.

(21) Appl. No.: 14/196,014

(22) Filed: Mar. 4, 2014

(65) Prior Publication Data

US 2014/0309799 A1 Oct. 16, 2014

(30) Foreign Application Priority Data

Apr. 15, 2013 (JP) ................................ 2013-084481

(51) Int. Cl.

*H02J 4/00* (2006.01)
*H02J 13/00* (2006.01)
*H02J 3/14* (2006.01)
*H02J 3/32* (2006.01)

(52) U.S. Cl.

CPC ............ *H02J 13/0079* (2013.01); *H02J 3/14* (2013.01); *H02J 3/32* (2013.01); *Y02B 70/3225* (2013.01); *Y04S 20/222* (2013.01)

(58) Field of Classification Search

None

See application file for complete search history.

(56) References Cited

U.S. PATENT DOCUMENTS 5,481,140 A * 1/1996 Maruyama ................ H02J 3/14 307/11
7,565,227 B2 * 7/2009 Richard ........... G06Q 10/06312 700/286
7,715,951 B2 * 5/2010 Forbes, Jr. ............ G01D 4/004 323/299

(Continued)

FOREIGN PATENT DOCUMENTS

JP 2002-010532 1/2002
JP 2005-094891 4/2005

(Continued)

OTHER PUBLICATIONS

Fouda et al. "A Novel Demand Control Policy for Improving Quality of Power Usage in Smart Grid", 2012 IEEE, pp. 5154-5159.*

(Continued)

*Primary Examiner* — Van Nguyen

(74) *Attorney, Agent, or Firm* — Nixon & Vanderhye, P.C.

(57) ABSTRACT

According to an embodiment, a request control device includes a receiving unit, a generating unit, and a sending unit. The receiving unit is configured to receive a first electric power control request issued for purpose of controlling electric power usage. The generating unit is configured to generate a second electric power control request, which is different than the first electric power control request, at least using the first electric power control request. The sending unit is configured to send the second electric power control request.

5 Claims, 12 Drawing Sheets

(56) References Cited

U.S. PATENT DOCUMENTS

| | | | | |
|---|---|---|---|---|
| 8,010,812 | B2 * | 8/2011 | Forbes, Jr. | G01D 4/004 700/22 |
| 8,082,068 | B2 * | 12/2011 | Rodgers | G01D 4/004 700/291 |
| 8,700,187 | B2 * | 4/2014 | Forbes, Jr. | G01D 4/004 323/299 |
| 8,806,239 | B2 * | 8/2014 | Forbes, Jr. | G01D 4/004 700/22 |
| 8,855,831 | B2 * | 10/2014 | Son | G01D 4/00 340/870.02 |
| 8,938,322 | B2 * | 1/2015 | Westergaard | H02J 3/14 700/291 |
| 9,002,761 | B2 * | 4/2015 | Montalvo | G06Q 10/06 322/38 |
| 9,066,300 | B2 * | 6/2015 | Peitzer | H04W 52/04 |
| 9,071,082 | B2 * | 6/2015 | Nishibayashi | H02J 3/32 |
| 9,188,109 | B2 * | 11/2015 | Lazaris | G06Q 30/0605 |
| 9,209,629 | B2 * | 12/2015 | Nishibayashi | H02J 7/0013 |
| 2009/0062970 | A1 | 3/2009 | Forbes, Jr. et al. | |
| 2010/0179670 | A1 * | 7/2010 | Forbes, Jr. | G01D 4/004 700/22 |
| 2011/0258018 | A1 | 10/2011 | Tyagi et al. | |
| 2011/0282505 | A1 | 11/2011 | Tomita et al. | |
| 2014/0046836 | A1 | 2/2014 | Kaneko et al. | |
| 2014/0172503 | A1 | 6/2014 | Hammerstrom et al. | |
| 2014/0236376 | A1 | 8/2014 | Joko | |

FOREIGN PATENT DOCUMENTS

| | | |
|---|---|---|
| JP | 2010-166636 | 7/2010 |
| JP | 2010-537622 | 12/2010 |
| JP | 2011-229374 | 11/2011 |
| WO | 2013-047114 | 4/2013 |

OTHER PUBLICATIONS

Faria et al. "Virtual Power Players Demand Response Programs Management Based on Locational Marginal Prices", 2012 IEEE, pp. 1-8.*

Law et al. "Demand response architectures and load management algorithms for energy-efficient power grids: a survey", 2012 IEEE, pp. 134-141.*

Kaneko et al., U.S. Appl. No. 13/919,254, filed Jun. 17, 2013.

Kaneko et al., U.S. Appl. No. 13/919,254, non-final office action mailed Sep. 16, 2014.

English-language machine translation of JP2002-010532.

* cited by examiner

FIG.4

| ELECTRICITY CONSUMER IDENTIFICATION INFORMATION | POWER-CONTROL-ZONE IDENTIFICATION INFORMATION | CLIENT DEVICE IDENTIFICATION INFORMATION | FUNCTION LIST | | | SCHEDULED ELECTRIC POWER USAGE |
|---|---|---|---|---|---|---|
| | | | FUNCTION IDENTIFICATION INFORMATION | MAXIMUM GAIN | ELECTRIC POWER USAGE | |
| 1 | 1 | 133.111.222.4 | ICE MAKING | 3 Kg/h | 1 kW/1 Kg | TOMORROW: 0:00~3:00: 10 KWh,<br>3:00~6:00: 10 KWh,<br>6:00~9:00: 15 KWh,<br>9:00~12:00: 30 KWh,<br>12:00~15:00: 30 KWh,<br>15:00~18:00: 40 KWh,<br>18:00~21:00: 15 KWh,<br>21:00~24:00: 10 KWh, |
| | | | | | | |
| 1 | 2 | 133.111.224.6 | ICE MAKING | 2 Kg/h | 0.5 kW/1 Kg | TOMORROW: 0:00~3:00: 10 KWh,<br>3:00~6:00: 10 KWh,<br>6:00~9:00: 15 KWh,<br>9:00~12:00: 30 KWh,<br>12:00~15:00: 30 KWh,<br>15:00~18:00: 40 KWh,<br>18:00~21:00: 15 KWh,<br>21:00~24:00: 10 KWh, |
| | | | | | | |

211
FIRST MANAGEMENT SERVER DEVICE
212
SECOND MANAGEMENT SERVER DEVICE
220
REQUEST CONTROL DEVICE
231
FIRST CLIENT DEVICE
232
SECOND CLIENT DEVICE
S201
ELECTRIC POWER CONTROL REQUEST
S203
ELECTRIC POWER CONTROL REQUEST
S205
ELECTRIC POWER CONTROL REQUEST
ELECTRIC POWER CONTROL REQUEST
S207
ELECTRIC POWER CONTROL REQUEST

411
FIRST MANAGEMENT SERVER DEVICE
420
REQUEST CONTROL DEVICE
431
FIRST CLIENT DEVICE
432
SECOND CLIENT DEVICE
433
THIRD CLIENT DEVICE
ELECTRIC POWER CONTROL REQUEST
S301
ELECTRIC POWER CONTROL REQUEST
S303
ELECTRIC POWER CONTROL REQUEST
S305
ELECTRIC POWER CONTROL REQUEST
S307

REQUEST CONTROL DEVICE, REQUEST CONTROL METHOD, AND COMPUTER PROGRAM PRODUCT FOR CONTROLLING ELECTRONIC USAGE

CROSS-REFERENCE TO RELATED APPLICATIONS

This application is based upon and claims the benefit of priority from Japanese Patent Application No. 2013-084481, filed on Apr. 15, 2013; the entire contents of which are incorporated herein by reference.

FIELD

Embodiments described herein relate generally to a request control device, a request control method, and a computer program product.

BACKGROUND

With regard to performing power control in electric grids which transmit and distribute electric power from electric power plants to electricity consumers; a method is being studied in which the electric power usage of the electricity consumers is controlled by implementing communication technology.

For example, in a method called demand response (DR) control, depending on the electric-generating capacity, an electric power provider that provides electric power sends DR control requests to the electricity consumers. A DR control request can be either a notification about the changes in the electric rate structure, or a mere notification of an electric power shortage, or a control request for switching ON/switching OFF the power source of the devices used by the electricity consumers.

Moreover, a method has been proposed in which a plurality of electricity consumers is divided into groups, and it is determined whether or not to perform DR control with respect to each group based on the history data of the electricity consumers belonging to that group. With that, the profit of the electric power provider is maximized while satisfying the maximum number of times and the maximum amount of time of DR control that is agreed upon in the contract with the electricity consumers.

However, in the conventional technology, there are concerns that the electric power receiving side faces disadvantages beyond necessity because of electric power control requests. Hence, there is room for improvement.

BRIEF DESCRIPTION OF THE DRAWINGS

FIG. 4 is a diagram illustrating an example of feature information according to the first embodiment;

DETAILED DESCRIPTION

According to an embodiment, a request control device includes a receiving unit, a generating unit, and a sending unit. The receiving unit is configured to receive a first electric power control request issued for purpose of controlling electric power usage. The generating unit is configured to generate a second electric power control request, which is different than the first electric power control request, at least using the first electric power control request. The sending unit is configured to send the second electric power control request.

Various embodiments are described below in detail with reference to the accompanying drawings.

First Embodiment

Figure 1:
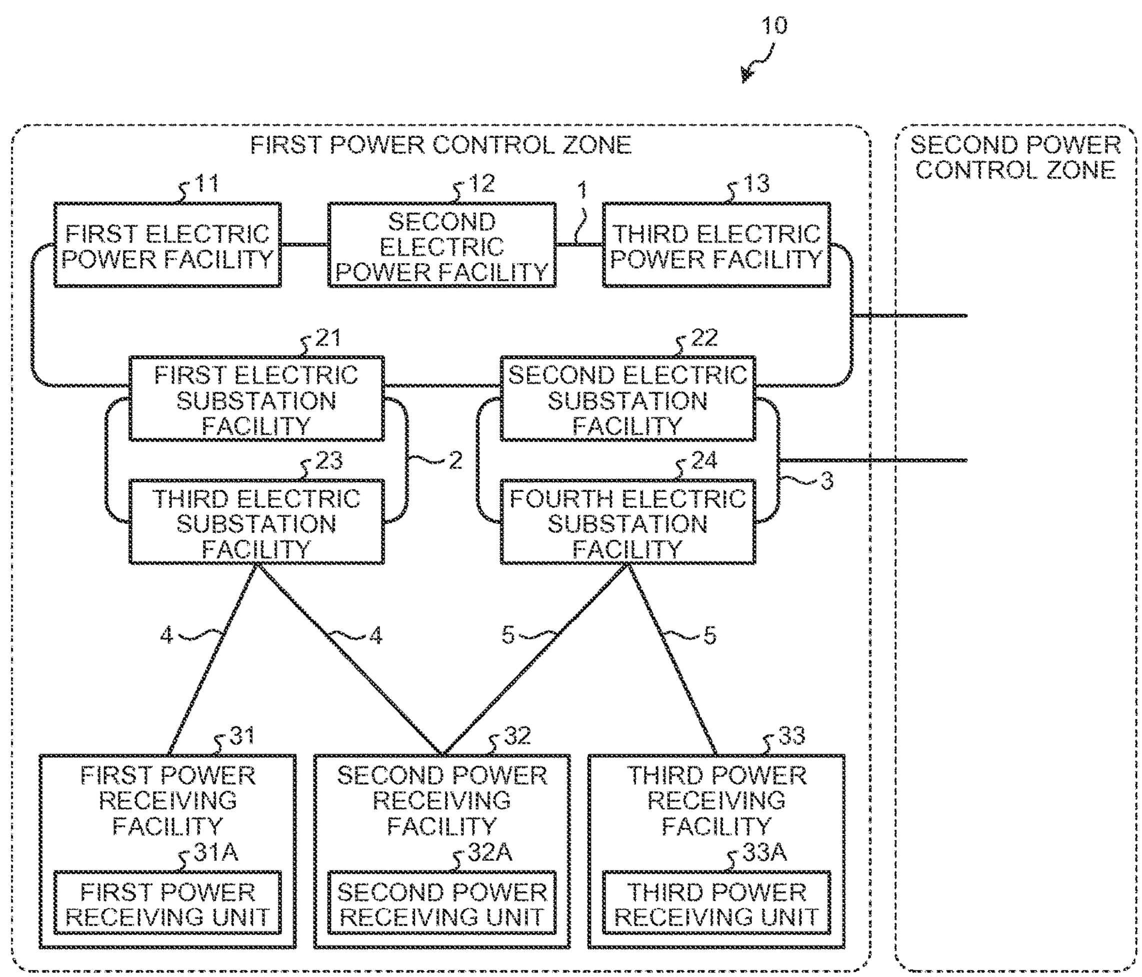
FIG. 1 is a diagram illustrating an exemplary configuration of an electric power system according to a first embodiment.

FIG. 1 is a diagram illustrating an exemplary configuration of an electric power system 10 according to a first embodiment. In the example illustrated in FIG. 1, a configuration in a first power control zone is illustrated as the electric power system 10, and the configuration in other power control zones such as a second power control zone is not illustrated. However, the configuration in other power control zones can be of the same type as the configuration in the first power control zone.

As illustrated in FIG. 1, the electric power system 10 includes a first electric power facility 11, a second electric power facility 12, a third electric power facility 13, a first electric substation facility 21, a second electric substation facility 22, a third electric substation facility 23, a fourth electric substation facility 24, a first power receiving facility 31, a second power receiving facility 32, a third power receiving facility 33, a high-voltage power grid 1, medium-voltage power grids 2 and 3, and electric grids 4 and 5.

The first electric power facility 11 to the third electric power facility 13 are electric power facilities such as nuclear power plants, thermal power plants, geothermal power plants, or wind power plants that generate electric power from an energy other than electric power. In the example illustrated in FIG. 1, three electric power facilities, namely, the first electric power facility 11 to the third electric power facility 13 are present. However, the number of electric power facilities is not limited to three; and as long as one or more electric power facilities are present, it serves the purpose.

The first electric substation facility 21 to the fourth electric substation facility 24 are electric substation facilities installed for the purpose of voltage conversion or frequency conversion. In the example illustrated in FIG. 1, four electric substation facilities, namely, the first electric substation facility 21 to the fourth electric substation facility 24 are present. However, the number of electric substation facilities is not limited to four; and as long as one or more electric substation facilities are present, it serves the purpose. Moreover, in the example illustrated in FIG. 1, it is assumed that the first electric substation facility 21 and the second electric substation facility 22 are high-voltage electric power substations, while the third electric substation facility 23 and the fourth electric substation facility 24 are medium-voltage electric power substations. However, that is not the only possible case.

The first power receiving facility 31 to the third power receiving facility 33 represent facilities of electricity consumers such as buildings, factories, condominium buildings, and standalone buildings that receive the electric power. In the example illustrated in FIG. 1, three power receiving facilities, namely, the first power receiving facility 31 to the third power receiving facility 33 are present. However, the number of power receiving facilities is not limited to three; and as long as one or more power receiving facilities are present, it serves the purpose.

The first power receiving facility 31 to the third power receiving facility 33 respectively include a first power receiving unit 31A to a third power receiving unit 33A for the purpose of receiving electric power. Herein, the first power receiving unit 31A to the third power receiving unit 33A are, for example, at least either power receiving devices, or transformers, or electric meters, or power circuit breakers.

The high-voltage power grid 1 performs electric power transmission at a high voltage (of, for example, 500 kV). In the example illustrated in FIG. 1, the high-voltage power grid 1 is connected not only to the first electric power facility 11 to the third electric power facility 13 but also to the first electric substation facility 21 and the second electric substation facility 22. Thus, the high-voltage power grid 1 transmits electric power, which is generated by the first electric power facility 11 to the third electric power facility 13, to the first electric substation facility 21 and the second electric substation facility 22.

The medium-voltage power grids 2 and 3 perform electric power transmission at a medium voltage (of, for example, 154 kV). In the example illustrated in FIG. 1, the medium-voltage power grid 2 is connected to the first electric substation facility 21 and the third electric substation facility 23; while the medium-voltage power grid 3 is connected to the second electric substation facility 22 and the fourth electric substation facility 24. Thus, the medium-voltage power grid 2 transmits electric power, which is subjected to power transformation by the first electric substation facility 21, to the third electric substation facility 23; while the medium-voltage power grid 3 transmits electric power, which is subjected to power transformation by the second electric substation facility 22, to the fourth electric substation facility 24.

In the example illustrated in FIG. 1, each of the high-voltage power grid 1 and the medium-voltage power grids 2 and 3 constitutes a ring topology. However, that is not the only possible case. Alternatively, it is also possible to implement a tree topology or a star topology.

The electric grids 4 and 5 distribute electric power. In the example illustrated in FIG. 1, the electric grid 4 is connected to the third electric substation facility 23 as well as to the first power receiving facility 31 and the second power receiving facility 32. Similarly, the electric grid 5 is connected to the fourth electric substation facility 24 as well as to the second power receiving facility 32 and the third power receiving facility 33. Thus, the electric grid 4 distributes electric power, which is subjected to power transformation by the third electric substation facility 23, to the first power receiving facility 31 and the second power receiving facility 32. Similarly, the electric grid 5 distributes electric power, which is subjected to power transformation by the fourth electric substation facility 24, to the second power receiving facility 32 and the third power receiving facility 33.

In the example illustrated in FIG. 1, each of the electric grids 4 and 5 constitutes a tree topology. However, that is not the only possible case. Alternatively, it is also possible to implement a ring topology or a star topology.

Meanwhile, the first electric power facility 11 to the third electric power facility 13, the first electric substation facility 21 to the fourth electric substation facility 24, the high-voltage power grid 1, the medium-voltage power grids 2 and 3, and the electric grids 4 and 5 are facilities operated by an electric power provider (hereinafter, sometimes referred to as “utility”) such as an electric power generating enterprise, an electric power transmitting and distributing enterprise, or an enterprise that handles electric power generation as well as transmission and distribution of electric power. Meanwhile, a utility is not limited to a single electric power provider, and can be a combination of two or more electric power providers.

Moreover, in the example illustrated in FIG. 1, the high-voltage power grid 1 and the medium-voltage power grid 3 are connected to the electric power system in the second power control zone by an electric power interchange network. With that, in case of an electric power shortage in the first power control zone, the electric power system 10 exchanges electric power with the electric power system in the second power control zone via the electric power interchange zone, and overcomes the electric power shortage.

Figure 2:
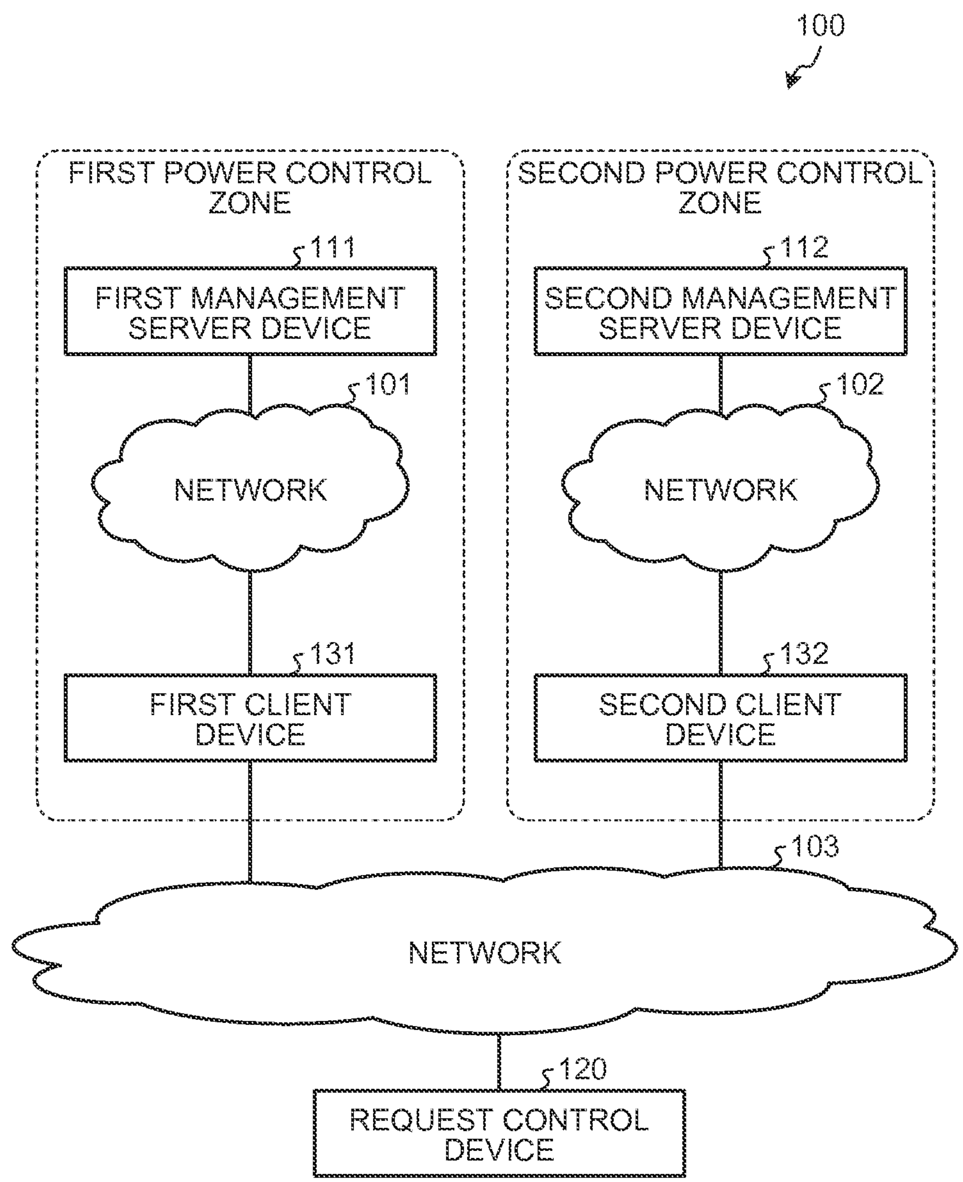
FIG. 2 is a diagram illustrating an exemplary configuration of an electric power control system according to the first embodiment.

FIG. 2 is a diagram illustrating an exemplary configuration of an electric power control system 100 according to the first embodiment. The electric power control system 100 controls the electric energy used in the power receiving facilities, such as the first power receiving facility 31 to the third power receiving facility 33, installed in the electric power system 10 explained with reference to FIG. 1. In the example illustrated in FIG. 2, a configuration in the first power control zone and the second power control zone is illustrated as the electric power control system 100, and the configuration in other power control zones is not illustrated. However, the configuration in other power control zones can be of the same type as the configuration in the first power control zone and the second power control zone.

As illustrated in FIG. 2, the electric power control system 100 includes a first management server device 111, a second management server device 112, a request control device 120, a first client device 131, and a second client device 132.

The first management server device 111 and the first client device 131 are installed in the first power control zone and are connected to each other via a network 101. The second management server device 112 and the second client device 132 are installed in the second power control zone and are connected to each other via a network 102. The request control device 120, the first client device 131, and the second client device 132 are connected to each other via a network 103.

The networks 101 to 103 can be implemented using, for example, the Internet or a local area network (LAN). Moreover, the networks 101 to 103 can be identical to each other or can be different from each other.

The first management server device 111 manages the supply of electric power in the first power control zone, and can be implemented using, for example, a computing machine such as a computer. Herein, it is assumed that the first management server device 111 is operated by a utility in the first power control zone. However, that is not the only possible case.

The first client device 131 is a client of the first management server device 111, and can be implemented using, for example, a computing machine such as a computer. In the example illustrated in FIG. 2, the first client device 131 is considered to be a client device in the first power control zone. However, the number of client devices is not limited to one; and as long as at least a single client device is present, it serves the purpose. In the first embodiment, it is assumed that the first client device 131 is installed in the first power receiving facility 31 (see FIG. 1) of an electricity consumer in the first power control zone. However, that is not the only possible case.

The second management server device 112 manages the supply of electric power in the second power control zone, and can be implemented using, for example, a computing machine such as a computer. Herein, it is assumed that the second management server device 112 is operated by a utility in the second power control zone. However, that is not the only possible case. Moreover, it is assumed that the utility that operates the first management server device 111 is different than the utility that operates the second management server device 112.

The second client device 132 is a client of the second management server device 112, and can be implemented using, for example, a computing machine such as a computer. In the example illustrated in FIG. 2, the second client device 132 is considered to be a client device in the second power control zone. However, the number of client devices is not limited to one; and as long as at least a single client device is present, it serves the purpose. In the first embodiment, it is assumed that the second client device 132 is installed in a power receiving facility (not illustrated) of an electricity consumer in the second power control zone. However, that is not the only possible case.

Meanwhile, it is assumed that the electricity consumer that owns the first power receiving facility 31, in which the first client device 131 is installed, is the same electricity consumer that owns the power receiving facility in which the second client device 132 is installed.

The first management server device 111 sends electric power control requests to the first client device 131 via the network 101; and the second management server device 112 sends electric power control requests to the second client device 132 via the network 102.

For example, it is assumed that the utility that operates the electric grids 4 and 5 also operates the first management server device 111; and the utility that operates electric grids (not illustrated) in the second power control zone also operates the second management server device 112.

In this case, when the electric power usage in the first power receiving facility 31 to the third power receiving facility 33 is likely to exceed the electric power distribution capacity, the first management server device 111 sends an electric power control request to the first client device 131. In practice, the first management server device 111 sends an electric power control request not only to the first client device 131 but also to the client devices (not illustrated) installed in the second power receiving facility 32 and the third power receiving facility 33. However, the explanation thereof is not given herein.

In an identical manner, when the electric power usage in the power receiving facilities of an electricity consumer in the second power control zone is likely to exceed the electric power distribution capacity, the second management server device 112 sends an electric power control request to the second client device 132. In practice, the second management server device 112 sends an electric power control request not only to the second client device 132 but also to the client devices (not illustrated) installed in the other power receiving facilities in the second power control zone. However, the explanation thereof is not given herein.

Herein, an electric power control request points to a request for controlling the electric power usage (consumption) in the power receiving facilities owned by an electricity consumer. An electric power control request can be issued in various forms.

For example, an electric power control request is issued to reduce the electric power usage in the current time slot or in a future time slot. The request to reduce the electric power usage can be a quantitative request issued to reduce the electric power usage either by a predetermined percentage of the maximum electric power usage or by a predetermined kilowatt (kW). Alternatively, the request to reduce the electric power usage can be a non-quantitative request such as a strong demand for reduction in the electric power usage or a not-so-strong demand for reduction in the electric power usage.

Moreover, for example, an electric power control request is issued either as a request specifying the amount of reduction in the electric power usage in the current time slot or in a future time slot, or as a request specifying the electric power unit price in the current time slot or in a future time slot (for example, from 0:00 to 8:00 of the next day: 10 yen/kWh; from 8:00 to 11:00 of the next day: 12 yen/kWh; from 11:00 to 16:00 of the next day: 20 yen/kWh; from 16:00 to 24:00 of the next day: 14 yen/kWh).

Furthermore, for example, an electric power control request is issued to order operation control (termination or energy-saving operations), in the current time slot or in a future time slot, of the devices that use electric power in the power receiving facilities. Herein, the devices that use electric power in the power receiving facilities can be of any type of devices that use electric power. Examples of such devices are air conditioners or illumination. However, that is not the only possible case.

An electric power control request is not limited to the abovementioned forms. Alternatively, for example, an electric power control request can be issued to increase the maximum amount of available electric energy and to increase the electric power usage, or can be issued as a notification that there is flexibility in the electric power supply.

Since electric power control requests can be issued in the forms explained above, it is desirable that an electric power control request has "type", "details", and "date". Herein, "type" represents the information indicating the type of an electric power control request. For example, "type" indicates whether an electric power control request is a request to reduce the electric power usage, or a notification of reduction in the electric power usage, or a notification of changes in the electric rate structure, or an operation control command. Moreover, "details" represents the information indicating the control details of an electric power control request. For example, "details" indicates the requested amount of reduction in the electric power, or the notified amount of reduction in the electric power, or the electric power charge, or the target devices for operation control and the details thereof. Furthermore, "date" represents the information indicating the date and hour of applying the control details. For example, "date" indicates a date and hour after the present point of time.

Meanwhile, the electric power control requests can be sent and received using electronic mails or using a protocol such as the hypertext transfer protocol (HTTP).

The first client device 131 receives an electric power control request from the first management server device 111, and sends that electric power control request to the request control device 120 via the network 103. Moreover, the first client device 131 receives an electric power control request, which is at least partially different from the electric power control request sent to the request control device 120, from the request control device 120 via the network 103.

The second client device 132 receives an electric power control request from the second management server device 112, and sends that electric power control request to the request control device 120 via the network 103. Moreover, the second client device 132 receives an electric power control request, which is at least partially different from the electric power control request sent to the request control device 120, from the request control device 120 via the network 103.

Herein, it is desirable that an electric power control request sent to the first client device 131 or the second client device 132 and an electric power control device received from the request control device 120 are different from each other in terms of at least either one of "type", "details", and "date".

Upon receiving an electric power control request from the request control device 120, the first client device 131 as well as the second client device 132 performs electric power control, such as controlling the operating state of the devices that use electric power in the power receiving facilities, according to the corresponding electric power control request.

For example, the first client device 131 as well as the second client device 132 performs electric power control by sending an operating state control command to the devices so as to control the electric power supplied to the devices or by directly controlling the operating state of the devices by turning the device ON/OFF.

Moreover, for example, the first client device 131 as well as the second client device 132 performs electric power control, such as controlling the operating state of the devices in an indirect manner, by generating information containing details that prompt the electricity consumer to take actions based on the details of the electric power control request or based on the electric power control request itself; sending that information to the electricity consumer using an electronic mail; and prompting the electricity consumer to control the operating state of the devices. An example of the text of an electronic mail is: "The demand and supply of electricity is on the verge of a crisis. Please refrain from using electricity during 11:00 to 16:00 tomorrow." Meanwhile, instead of sending an electronic mail, sound alarms or light alarms can be issued to prompt the electricity consumer to control the operating state of the devices. Alternatively, instead of sending an electric power control request to the first client device 131 and the second client device 132, the request control device 120 can send an electronic mail directly to the electricity consumer.

Meanwhile, the first client device 131 as well as the second client device 132 can also send the scheduled electric power usage thereof, which is related to the electric power usage thereof in the future, to the request control device 120. For example, if the power receiving facility in which the first client device 131 or the second client device 132 is installed is a factory, then the scheduled electric power usage can be calculated from the scheduled operations of the production capacity. In contrast, for example, if the power receiving facility in which the first client device 131 or the second client device 132 is a restaurant, then the scheduled electric power usage can be calculated from the estimated number of customers visiting the restaurant. The scheduled electric power usage can be sent on a periodic base, can be sent at the same timing as the timing at which an electric power control request is sent to the request control device 120, or can be sent at both types of timing.

The request control device 120 updates electric power control requests and can be implemented using, for example, a computing machine such as a machine. Herein, it is assumed that the request control device 120 is operated by the electricity consumer (entity) that owns the first power receiving facility 31, in which the first client device 131 is installed, or owns the power receiving facility in which the second client device 132 is installed. However, that is not the only possible case. Meanwhile, in the first embodiment, the explanation is given under the assumption that the electricity consumer that operates the request control device 120 runs an ice making business. However, that is not the only possible case. Upon receiving an electric power control device from the first client device 131 or the second client device 132, the request control device 120 optimizes the electric power control request and sends the optimized version of the electric power control request to the first client device 131 or the second client device 132 via the network 103.

Figure 3:
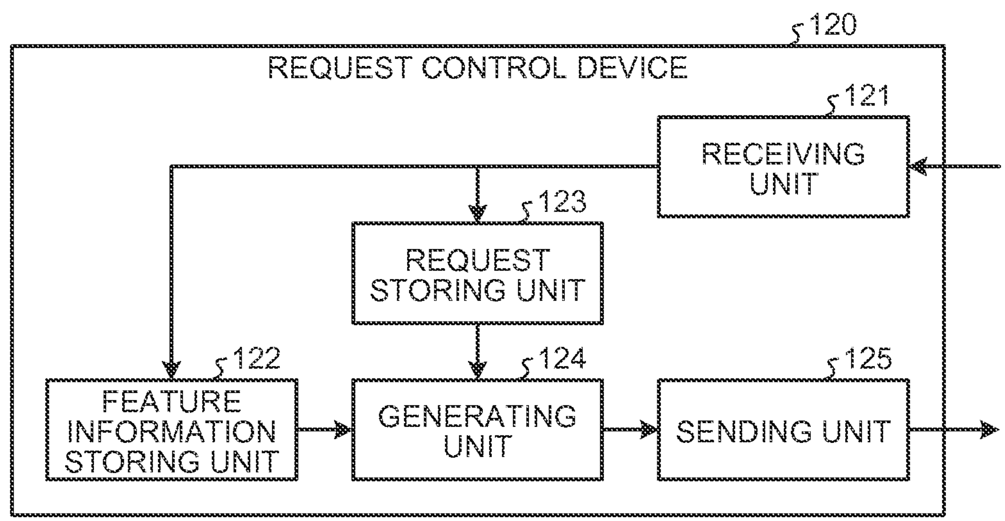
FIG. 3 is a diagram illustrating an exemplary configuration of a request control device according to the first embodiment.

FIG. 3 is a diagram illustrating an exemplary configuration of the request control device 120 according to the first embodiment. As illustrated in FIG. 3, the request control device 120 includes a receiving unit 121, a feature information storing unit 122, a request storing unit 123, a generating unit 124, and a sending unit 125.

The receiving unit 121, the generating unit 124, and the sending unit 125 can be implemented by executing computer programs in a processing device such as a central processing unit (CPU), that is, can be implemented using software; or can be implemented using hardware such as a network interface card (NIC); or can be implemented using a combination of software and hardware. The feature information storing unit 122 can be implemented using a memory device such as a hard disk drive (HDD), a solid state drive (SSD), a memory card, an optical disk, a read only memory (ROM), or a random access memory (RAM) in which information can be stored in a magnetic, optical, or electrical manner.

The receiving unit 121 receives feature information and electric power control requests. The feature information is related to the features of the electric power usage in the first client device 131 and the second client device 132, which are the destinations for sending the electric power control requests generated by the request control device 120.

For example, the receiving unit 121 can receive the feature information from a computer (not illustrated) of the electricity consumer (entity) that operates the request control device 120, or can receive the feature information from an input device (not illustrated) such as a mouse or a keyboard of the request control device 120.

Herein, the feature information received by the receiving unit 121 can either be the feature information itself or be a command for updating (adding, modifying, or deleting) the feature information that is stored in the feature information storing unit 122. The receiving unit 121 can receive the feature information or a command for updating the feature information either as, for example, a message via the network 103 using a protocol such as the HTTP or the simple object access protocol (SOAP), or as an input event from an input device.

The feature information storing unit 122 is used to store the feature information received by the receiving unit 121. The feature information that is stored in the feature information storing unit 122 is updated by the feature information received by the receiving unit 121 or is updated according to a command received by the receiving unit 121 for updating the feature information.

Thus, when the receiving unit 121 receives the feature information or receives a command for updating the feature information, it either updates the feature information stored in the feature information storing unit 122 with the received feature information or updates the feature information stored in the feature information storing unit 122 according to the received command for updating the feature information.

FIG. 4 is a diagram illustrating an example of the feature information according to the first embodiment. As illustrated in FIG. 4, the feature information contains electricity consumer identification information, power-control-zone identification information, client device identification information, a function list, and a scheduled electric power usage.

The electricity consumer identification information serves as an identifier that enables identification of the electricity consumers. The power-control-zone identification information serves as an identifier that enables identification of the power control zones. The client device identification information serves as an identifier that enables identification of the client devices. In the example illustrated in FIG. 4, the client device identification information is given in the form of IP addresses.

The function list includes function identification information, maximum gain per unit time, and electric power usage per unit gain. In the example illustrated in FIG. 4, the function identification information is given in the form of function names. The maximum gain per unit time represents the maximum ice making quantity per hour. The electric power usage per unit gain represents the electric power usage required for making one kilogram of ice. Meanwhile, the scheduled electric power usage represents the scheduled electric power usage in future time slots.

In the first embodiment, since it is assumed that the electricity consumer that operates the request control device 120 runs an ice making business, the explanation herein is given about an example in which the function list includes ice making functions. However, the function list is not limited to this case. Alternatively, for example, the function list can include various manufacturing/production functions (such as automobile manufacturing functions, electric appliance manufacturing functions, processed food production functions, and restaurant cooking appliance production functions).

Moreover, instead of having the function list include the manufacturing/production functions that are directly related to the business of the electricity consumer operating the request control device 120, the function list can include air conditioning functions or advertisement functions (displays or neon signs) that are related in an indirect manner. If the function list includes air conditioning functions, then the gain represents maintaining the temperature to a preset temperature, and thus the maximum gain carries no meaning. Herein, the gain can be defined for each different preset temperature. If the function list includes advertisement functions, then the gain represents the sales associated with the effect of attracting guests, and thus the maximum gain carries no meaning.

The scheduled electric power usage represents the scheduled electric power usage of the first client device 131 and the second client device 132 in the future. However, it is also possible to omit the scheduled electric power usage.

Following is the continuation of the explanation of the receiving unit 121.

The receiving unit 121 receives electric power control requests from the first client device 131 and the second client device 132. In the first embodiment, an electric power control request includes target identification information for control, client device identification information, control information, request identification information, and utility identification information.

The target identification information for control represents an identifier of the target to be controlled by an electric power control request. For example, the power-control-zone identification information can be used as the target identification information for control. The client device identification information represents an identifier that enables identification of the client device that sent the electric power control request directly to the request control device 120. Herein, the client device identification information can be given in the form of an IP address. The control information contains "type" (i.e., the information indicating the type of the electric power control request), "details" (i.e., the information indicating the control details of the electric power control request, and "date" (i.e., the information indicating the date and hour of applying the control details) mentioned above. The request identification information represents an identifier of the electric power control request. The utility identification information represents an identifier of the utility that sent the electric power control request.

Meanwhile, an electric power control request may also include at least some portion of the feature information. For example, an electric power control request may include the scheduled electric power usage mentioned in the example illustrated in FIG. 4. In such a case, the first client device 131 or the second client device 132 sets at least a portion (for example, at least the scheduled electric power usage) of the feature information and includes it in an electric power control request before sending that electric power control request to the request control device 120. When the scheduled electric power usage is included in an electric power control request; that scheduled electric power usage either can be added in the feature information stored in the feature information storing unit 122 as illustrated in FIG. 4 or can be kept included in the electric power control request as it is.

The request storing unit 123 is used to store the electric power control requests that are received by the receiving unit 121. If the request identification information of an electric power control request that is stored in the request storing unit 123 is identical to the request identification information of an electric power control request that is newly received by the receiving unit 121, then the electric power control request that is stored in the request storing unit 123 is updated with the electric power control request that is newly received by the receiving unit 121. On the other hand, if the request identification information of an electric power control request that is stored in the request storing unit 123 is not identical to the request identification information of an electric power control request that is newly received by the receiving unit 121, then the electric power control request that is newly received by the receiving unit 121 is newly stored in the request storing unit 123.

Thus, upon receiving an electric power control request, the receiving unit 121 determines whether or not the request identification information of that electric power control request is identical to the request identification information of an electric power control request that is already stored in the request storing unit 123. If the two pieces of request identification information match with each other, then the receiving unit 121 updates the electric power control request having the identical request identification information with the electric power control request that is received. On the other hand, if the two pieces of request identification information do not match with each other, then the request receiving unit 121 stores the received electric power control request in the request storing unit 123. Moreover, if the current date and hour has elapsed the "date" included in the control information of an electric power control request, then the receiving unit 121 can be configured to delete that electric power control request from the request storing unit 123.

The generating unit 124 refers to the feature information stored in the feature information storing unit 122 and the electric power control requests stored in the request storing unit 123, and accordingly generates a new electric power control request. For example, the generating unit 124 refers to the feature information stored in the feature information storing unit 122 and an electric power control request stored in the request storing unit 123; calculates an electric power usage allowance in the client device which sent that electric power control request to the request control device 120; and accordingly generates a new electric power control request.

For example, when the "type" of an electric power control request stored in the request storing unit 123 indicates a notification of changes in the electric rate structure, the generating unit 124 calculates such a volume of production that enables maximization of the gain of the electricity consumer in the changed electric rate structure; and generates a new electric power control request. Herein, the volume of production is one example of the electric power usage allowance.

Assume that t represents the timing; $C_j(t)$ represents the electricity rate for a function j; $F_j(t)$ represents the total gain for the function j; $x_{ij}(t)$ represents the volume of production of the gain for the function j of an electricity consumer i; $a_{ij}(t)$ represents the used electric power on a gain-by-gain basis with respect to the function j of the electricity consumer i; and $p_i(t)$ represents the price (yen/kWh) per unit electric power of the electricity consumer i. Herein, $C_j(t)$, $F_j(t)$, $x_{ij}(t)$, $a_{ij}(t)$, and $p_i(t)$ can be identified using at least either the feature information or an electric power control request. Moreover, the electricity consumer i represents a cardinal number of combinable elements of an electricity consumer. In the first embodiment, the power receiving facilities owned by an electricity consumer are assumed to be the combinable elements of that electricity consumer. When there is a plurality of such sets, an electric power control request is newly generated for each such set in an independent manner.

The volume of production of the gain $x_{ij}(t)$ that minimizes the total cost C(t) and maximizes the total gain F(t) can be obtained using Expression (1) to Expression (4) given below. However, in case the volume of production of the gain $x_i$ (t) cannot be uniquely determined using only Expression (1) to Expression (4), other constraint conditions may also be added. Meanwhile, herein, the total cost means the total electric power charge.

$$C(t)=\Sigma_j C_j(t) \text{ for all } j \tag{1}$$

$$F(t)=\Sigma_j F_j(t) \text{ for all } j \tag{2}$$

$$C_j(t)=\Sigma_i a_{ij}(t)p_i(t)x_{ij}(t) \text{ for all } i \tag{3}$$

$$F_j(t)=\Sigma_i x_{ij}(t) \text{ for all } i \tag{4}$$

With that, for each function j of the electricity consumer i, the volume of production ($x_{ij}(t)$: $t=t_1, t_2, \ldots$ ) in each time slot is obtained. As a result, the generating unit 124 generates a new electric power control request including that volume of production.

Meanwhile, for example, when the "type" of an electric power control request stored in the request storing unit 123 indicates a request to reduce the electric power usage, such a volume of production is calculated that maximizes the gain of the electricity consumer in the reduced electric power usage; and generates a new electric power control request.

In this case, a maximum electric energy $E_j(t)$ that can be used by the electricity consumer i is greater than the electric energy required in the production of the gain for the function j of the electricity consumer i. The volume of production $x_{ij}(t)$ that enables maximization of the total gain F(t) can be obtained using Expression (2), Expression (4), and Expression (5). However, in case the volume of production $x_{ij}(t)$ cannot be uniquely determined using only Expression (2), Expression (4), and Expression (5); other constraint conditions may also be added.

$$E_i(t)\geq\Sigma_j a_{ij}(t)x_{ij}(t) \text{ for all } j \tag{5}$$

Using Expression (5), a constraint that the maximum electric energy $E_j(t)$ usable by the electricity consumer i is greater than the electric energy required in the production of the gain for the function j of the electricity consumer i is guaranteed. Meanwhile, the maximum electric energy $E_j(t)$ usable by the electricity consumer i is obtained using Expression (6).

$$E_j(t)=M_j-D_j(t) \tag{6}$$

Herein, $M_j$ represents the maximum electric power usage of the electricity consumer i. That is, $M_j$ can be the maximum electric energy for which the electricity consumer i has made a contract with a utility, or can be a predicted value (such as a baseline) that is derived from the past usage record. Moreover, $D_j(t)$ represents the requested amount of reduction in the electric power.

With that, for each function j of the electricity consumer i, the volume of production ($x_{ij}(t)$: $t=t_1, t_2, \ldots$ ) in each time slot is obtained. As a result, the generating unit 124 generates a new electric power control request including that volume of production.

Meanwhile, for example, when the "type" of an electric power control request stored in the request storing unit 123 indicates an operation control command, the generating unit 124 calculates such a volume of production that enables maximizing the gain of the electricity consumer within the scope in which the operation control command is not violated, and accordingly generates a new electric power control request.

More particularly, within the scope in which the operation control command is not violated, the generating unit 124 obtains such a volume of production $x_{ij}$ (t) that enables maximizing the total gain F(t); and generates a new electric power control request including that volume of production.

As a result of implementing the abovementioned techniques, the generating unit 124 generates a new electric power control request that is different from the electric power control requests stored in the request storing unit 123 in terms of at least the "details".

Meanwhile, the expression used to obtain the volume of production $x_{ij}(t)$ can have various modifications. For example, the volume of production $x_{ij}(t)$ can be obtained using the scheduled electric power usage and by further adding a constraint condition that the scheduled electric power usage does not fall below a predetermined value.

The generating unit 124 can generate a new electric power control request either at the timing at which an electric power control request is received from the receiving unit 121, or on a periodic base, or before a predetermined time such as the date and hour specified in the electric power control request stored in the request storing unit 123.

The sending unit 125 sends the electric power control request, which is newly generated by the generating unit 124, to the client device that sent to the request control device 120 the electric power control request used in the generation of the new electric power control request.

Figure 5:
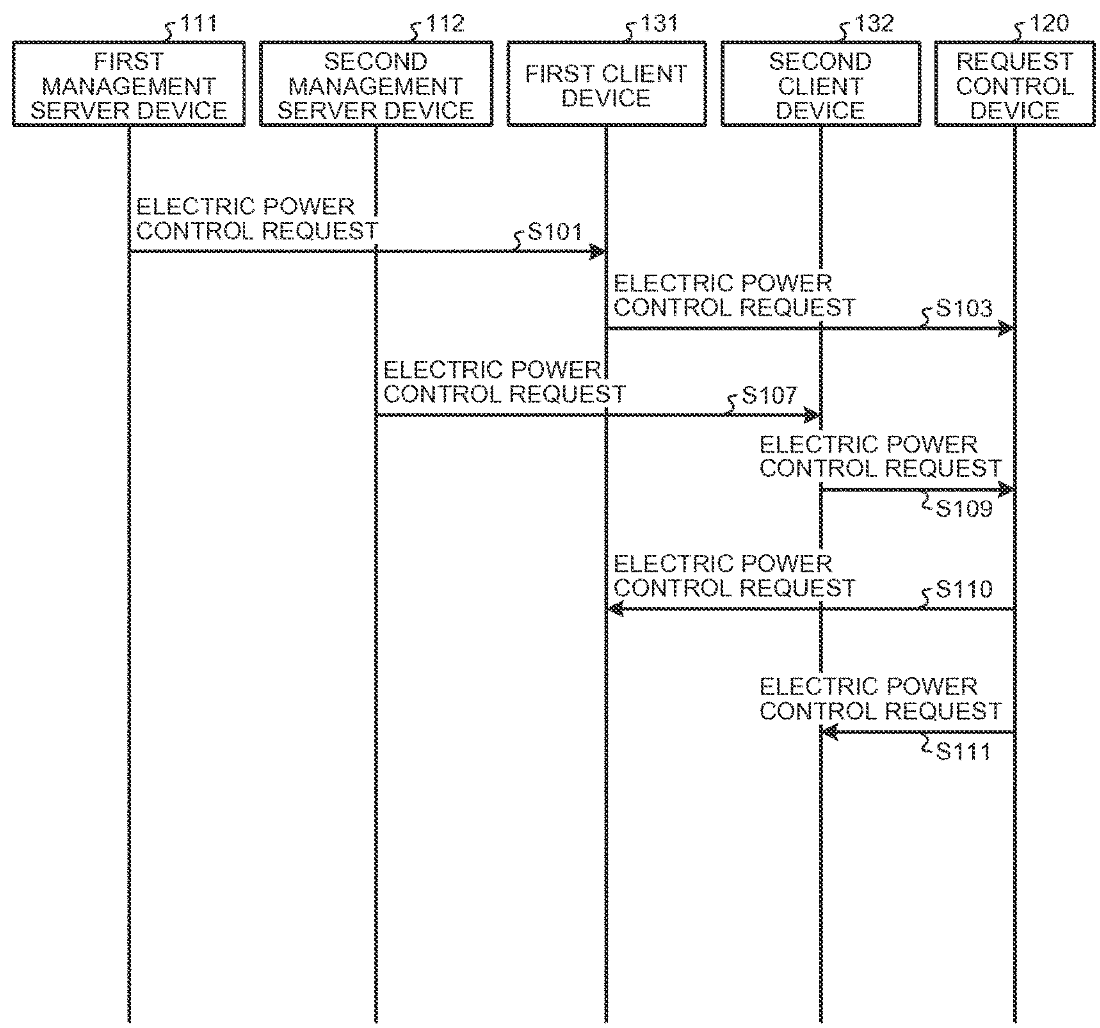
FIG. 5 is a sequence diagram illustrating an example of operations performed in the electric power control system according to the first embodiment.

FIG. 5 is a sequence diagram illustrating an example of operations performed in the electric power control system 100 according to the first embodiment.

Firstly, in the first power control zone, when a condition for sending electric power control requests is satisfied, the first management server device 111 sends an electric power control request to each client device, including the first client device 131, that is installed in the first power control zone (Step S101).

Herein, for example, the condition for sending electric power control requests points to a case in which, as compared to the maximum supply of electric power done during the next day by the utility that manages the first management server device 111, the predictive electricity consumption during the next day by the clients that receive the distribution of electric power from that utility is different by an amount smaller than a threshold value. However, that is not the only possible case. Meanwhile, it is desirable that the determination of whether or not the abovementioned difference is smaller than the threshold value is performed by first management server device 111 every day at predetermined time intervals.

Upon receiving the electric power control request from the first management server device 111, the first client device 131 sends that electric power control request to the request control device 120 (Step S103). At that time, the first client device 131 may include the scheduled electric power usage thereof in the electric power control request.

Upon receiving the electric power control device from the first client device 131, the receiving unit 121 of the request control device 120 either newly stores that electric power control request in the request storing unit 123 or updates an electric power control request stored in the request storing unit 123 with the electric power control request that is received.

Then, in the second power control zone, when a condition for sending electric power control requests is satisfied, the second management server device 112 sends an electric power control request to each client device, including the second client device 132, present in the second power control zone (Step S107).

Upon receiving the electric power control request from the second management server device 112, the second client device 132 sends that electric power control request to the request control device 120 (Step S109). At that time, the second client device 132 may include the scheduled electric power usage thereof in the electric power control request.

Upon receiving the electric power control device from the second client device 132, the receiving unit 121 of the request control device 120 either newly stores that electric power control request in the request storing unit 123 or updates an electric power control request stored in the request storing unit 123 with the electric power control request that is received.

Then, at the timing for generating a new electric power control request, the generating unit 124 of the request control device 120 refers to the feature information stored in the feature information storing unit 122 and the electric power control requests stored in the request storing unit 123; calculates an electric power usage allowance that maximizes the gain of the electricity consumer; and accordingly generates a new electric power control request with respect to each electric power control request stored in the request storing unit 123.

Then, the sending unit 125 of the request control device 120 sends the electric power control request, which is newly generated for the first client device 131, to the first client device 131 (Step S110); and sends the electric power control request, which is newly generated for the second client device 132, to the second client device 132 (Step S111).

Subsequently, the first client device 131 as well as the second client device 132 receives the corresponding new electric power control request from the request control device 120; and, according to the electric power usage allowance included in the corresponding new electric power control request, controls the power receiving facility in which it itself is installed.

In this way, in the first embodiment, the request control device 120 takes into account the features of electric power usage of the power receiving facilities of the electricity consumer which operates the request control device 120; and generates a new electric power control request from the received electric power control requests. Hence, according to the first embodiment, while fulfilling the electric power control requests that are received, the request control device 120 can generate such an electric power control request that maximizes the gain of the electricity consumer by making the power receiving facilities operate in cooperation with each other. Thus, it becomes possible to reduce the adverse effect occurring on the electric power receiving side due to controlling the electric power usage.

For example, according to the first embodiment, in a particular time slot, when the electric power charge in a particular power control zone becomes costlier than the electric power charge in another power control zone; the request control device 120 can generate an electric power control request for lowering the volume of production in the power receiving facilities present in the particular power control zone (i.e., reducing the electric power usage) and increasing the volume of production in the power receiving facilities present in the other power control zone (i.e., increasing the electric power usage). As a result, while maintaining the volume of production in the power receiving facilities, it becomes possible to hold down the electric power charge required to maintain the volume of production.

Meanwhile, the features of electric power usage of the power receiving facilities of the electricity consumer that operates the request control device 120 are highly-confidential information for that electricity consumer. Hence, it is not desirable and practical to let the first management server device 111 or the second management server device 112 operated by a different electricity consumer to manage such information.

In this way, in the first embodiment, the request control device 120 proves useful in reducing the adverse effect occurring on the electricity consumer that operates the request control device 120. Besides, since it is possible to use information that is not desirable to be managed outside, it becomes possible to generate a new electric power control request that enables achieving reduction in the adverse effect occurring on the electric power receiving side.

Meanwhile, in the first embodiment, the explanation is given for an example in which client devices (power receiving facilities) positioned in a plurality of power control zones are considered to be the targets for management by the request control device 120. However, alternatively, client devices (power receiving facilities) positioned in only a single power control zone can also be considered to be the targets for management. In that case, it is possible to have one or more utilities in the single power control zone.

For example, regarding a case in which a plurality of utilities is present in a single power control zone, an example can be cited in which the utility operating the electric grid 4 is different than the utility operating the electric grid 5.

Moreover, for example, regarding a case in which a single utility is present in a single power control zone, it is possible to generate an electric power control request that, in tune with the target volume of production, controls operation/termination of such power receiving facilities which have a low volume of production from among the power receiving facilities to be managed. With that, the target volume of production can be achieved by preferentially operating the power receiving facilities having a high volume of production. That enables achieving reduction in the electric power charge required in achieving the target volume of production. That proves particularly useful in the case in which the power receiving facilities need to be operated continually for long periods of time in an ice making factory or in a semiconductor manufacturing factory.

First Modification

In the first embodiment, the explanation is given for an example in which the feature information mainly points to the function list. However, that is not the only possible case.

Alternatively, for example, the feature information can point to the device configuration in the power receiving facilities of the electricity consumer and the degree of importance of each device. In that case, for a time slot in which the electric power charge of a received electric power control request is higher than a threshold value, the request control device 120 can generate a new electric power control request that includes a termination command for terminating the operations of the devices having low degrees of importance.

Alternatively, for example, the feature information can point to the desired upper limit of the total electric power charge of the electricity consumer during a particular period of time. In that case, the request control device 120 can make a projection of the electric power charge by referring to the electric energy used in the past in the power receiving facilities of the electricity consumer and by referring to the electric power charge of the electric power control request that is received; compare the projected electric power charge with the desired upper limit; and generate a new electric power control request that includes a termination command for terminating the operations of the devices.

Second Embodiment

In a second embodiment, the explanation is given about an example in which a plurality of electric power control requests is merged. The following explanation is given with the focus on the differences with the first embodiment; and the constituent elements having identical functionality to the first embodiment are referred to by the same names/reference numerals as in the first embodiment. Moreover, the explanation of such constituent elements is not repeated.

Firstly, an electric power system according to the second embodiment has an identical configuration to that described in the first embodiment. Hence, that explanation is not repeated.

Figure 6:
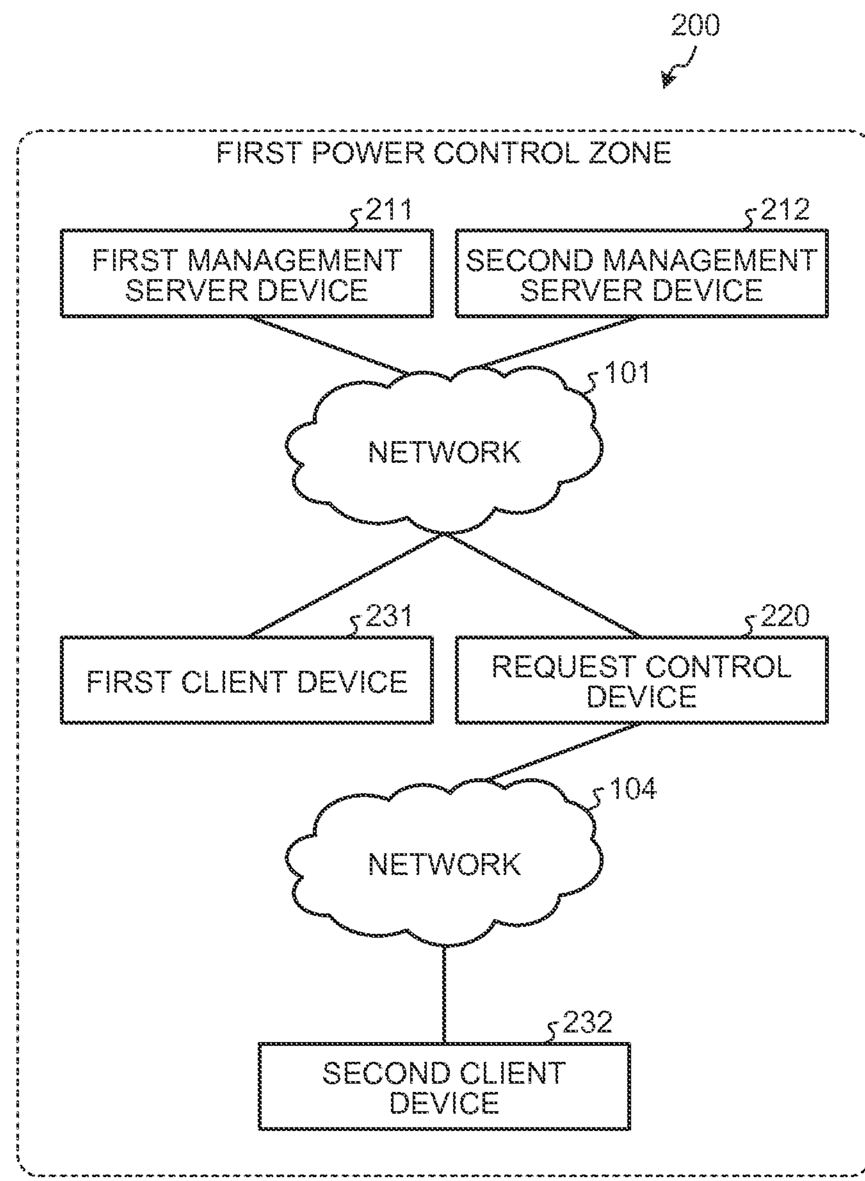
FIG. 6 is a diagram illustrating an exemplary configuration of an electric power control system according to a second embodiment.

FIG. 6 is a diagram illustrating an exemplary configuration of an electric power control system 200 according to the second embodiment. In the example illustrated in FIG. 6, a configuration in the first power control zone is illustrated as the electric power control system 200, and the configuration in other power control zones is not illustrated. However, the configuration in other power control zones can be of the same type as the configuration in the first power control zone.

As illustrated in FIG. 6, the electric power control system 200 includes a first management server device 211, a second management server device 212, a request control device 220, a first client device 231, and a second client device 232.

The first management server device 211, the second management server device 212, the first client device 231, and the request control device 220 are connected to each other via the network 101. Moreover, the request control device 220 and the second client device 232 are connected to each other via a network 104.

The networks 101 and 104 can be implemented using, for example, the Internet or a local area network (LAN). Moreover, the networks 101 and 104 can be identical to each other or can be different from each other.

The first management server device 211 manages the supply of electric power in the first power control zone. In the second embodiment, it is assumed that the first management server device 211 is operated by the utility that also operates the electric grid 4 (see FIG. 1), while the second management server device 212 is operated by the utility that also operates the electric grid 5 (see FIG. 1).

However, the utility that operates the first management server device 211 need not operate only the electric grid 4 but can also operate the first electric power facility 11, the second electric power facility 12, the first electric substation facility 21, the third electric substation facility 23, and the medium-voltage power grid 2. In an identical manner, the utility that operates the second management server device 212 need not operate only the electric grid 5 but can also operate the third electric power facility 13, the second electric substation facility 22, the fourth electric substation facility 24, and the medium-voltage power grid 3. As far as the high-voltage power grid 1 is concerned, either the utility operating the first management server device 211 and the utility operating the second management server device 212 can operate the high-voltage power grid 1 in collaboration with each other or some other utility can operate the high-voltage power grid 1.

The first client device 231 is a client of the first management server device 211, and is assumed to be installed in the first power receiving facility 31 (see FIG. 1). However, that is not the only possible case. The second client device 232 is a client of the request control device 220, and is assumed to be installed in the second power receiving facility 32 (see FIG. 1). However, that is not the only possible case. Furthermore, it is assumed that the request control device 220 is a client of the first management server device 211 and the second management server device 212, and is operated by the electricity consumer (entity) that owns the second power receiving facility 32. However, that is not the only possible case. Meanwhile, as illustrated in FIG. 1, the second power receiving facility 32 receives distribution of electric power from both the electric grids 4 and 5.

The first management server device 211 sends electric power control requests to the first client device 231 or the request control device 220 via the network 101; while the second management server device 212 sends electric power control requests to the request control device 220 via the network 101. For example, when the electric power usage in the first power receiving facility 31 and the second power receiving facility 32 is likely to exceed the electric power distribution capacity, the first management server device 211 sends an electric power control request to the first client device 231 or to the request control device 220. Similarly, for example, when the electric power usage in the second power receiving facility 32 and the third power receiving facility 33 is likely to exceed the electric power distribution capacity, the second management server device 212 sends an electric power control request to the request control device 220. In practice, the second management server device 212 sends an electric power control request not only to the request control device 220 but also to the client devices (not illustrated) installed in the third power receiving facility 33. However, the explanation thereof is not given herein.

The first client device 231 receives an electric power control request from the first management server device 211 and performs electric power control, such as controlling the operating state of the devices that use electric power in the first power receiving facility 31, according to the electric power control request that is received.

The request control device 220 receives electric power control requests from the first management server device 211 and the second management server device 212, and merges the electric power control requests that are received. Then, the request control device 220 sends a new electric power control request, which is obtained by means of merging, to the second client device 232 via the network 104.

The second client device 232 receives an electric power control request from the request control device 220, and performs electric power control, such as controlling the operating state of the devices that use electric power in the second power receiving facility 32, according to the electric power control request that is received.

Figure 7:
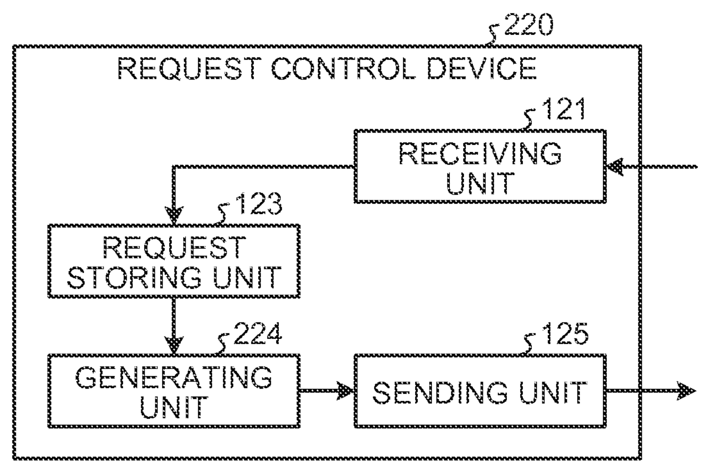
FIG. 7 is a diagram illustrating an exemplary configuration of a request control device according to the second embodiment.

FIG. 7 is a diagram illustrating an exemplary configuration of the request control device 220 according to the second embodiment. As illustrated in FIG. 7, a generating unit 224 in the request control device 220 is different than the first embodiment.

The receiving unit 121 receives electric power control requests. In the second embodiment, the receiving unit 121 receives electric power control requests from the first management server device 211 and the second management server device 212.

The request storing unit 123 is used to store the electric power control requests that are received by the receiving unit 121.

The generating unit 224 generates a new electric power control request using a plurality of electric power control requests stored in the request storing unit 123. More particularly, the generating unit 224 generates a new electric power control request using electric power control requests that are stored in the request storing unit 123 after being sent from the first management server device 211 and using electric power control requests that are stored in the request storing unit 123 after being sent from the second management server device 212.

For example, when the "type" of each electric power control request stored in the request storing unit 123 indicates a notification of changes in the electric rate structure, the generating unit 224 calculates such an electric rate structure which minimizes the cost of the electricity consumer in the changed electric rate structure, and calculates a new electric power control request. An electric rate structure C(t) that minimizes the cost of the electricity consumer can be obtained using, for example, Expression (7).

$$C(t)=\min_k\{C_k(t)\} \quad (7)$$

Herein, t represents the timing; $C_k(t)$ represents the electric power charge offered by a utility k; and $\min_k\{C_k(t)\}$ represents $C_k(t)$ having the smallest value.

For example, assume that the electric power control requests sent from the first management server device 211 have the electric rate structure as follows: from 0:00 to 8:00: 10 yen/kWh; from 8:00 to 11:00: 22 yen/kWh; from 11:00 to 16:00: 20 yen/kWh; and from 16:00 to 24:00: 24 yen/kWh. Similarly, for example, assume that the electric power control requests sent from the second management server device 212 have the electric rate structure as follows: from 0:00 to 8:00: 20 yen/kWh; from 8:00 to 11:00: 32 yen/kWh; from 11:00 to 16:00: 10 yen/kWh; and from 16:00 to 24:00: 34 yen/kWh. In that case, using Expression (7), the electric rate structure in the new electric power control request becomes as follows: from 0:00 to 8:00: 10 yen/kWh; from 8:00 to 11:00: 22 yen/kWh; from 11:00 to 16:00: 10 yen/kWh; and from 16:00 to 24:00: 24 yen/kWh.

As a result, such an electric rate structure is obtained that has the minimum electric power charge (C(t): $t=t_1, t_2, t_3, \ldots$) for each time slot. Hence, the generating unit 224 generates a new electric power control request including that electric rate structure. Meanwhile, apart than the case of the electric power charge, in the case in which there is an upper limit to the electric energy that can be received from each electric grid, it is possible to take into account that condition and include it in the control details. As a result, it becomes possible to apply control in such a way that the receivable electric energy is not exceeded.

Moreover, for example, when the "type" of an electric power control request stored in the request storing unit 123 indicates a request to reduce the electric power usage, the generating unit 224 calculates such electric power usage that maximizes the available post-reduction electric power usage, and generates a new electric power control request. An electric power usage $E_i(t)$ that maximizes the available post-reduction electric power usage can be obtained using, for example, Expression (8).

$$E_i(t)=\Sigma_k\{R_{ki}?D_k(t)\} \quad (8)$$

Herein, $D_k(t)$ represents the amount of reduction in electric power as requested by the utility k; and $R_{ki}$ represents the baseline from the utility k of the electricity consumer i.

As a result, the maximum electric power usage ($E_i(t)$:$t=t_1, t_2, \ldots$) for each time slot is obtained. Hence, the generating unit 224 generates a new electric power control request including the maximum electric power usage.

The sending unit 125 sends the electric power control request that is newly generated by the generating unit 224. In the second embodiment, the sending unit 125 sends the electric power control request, which is newly generated by the generating unit 224, to the second client device 232.

Figure 8:
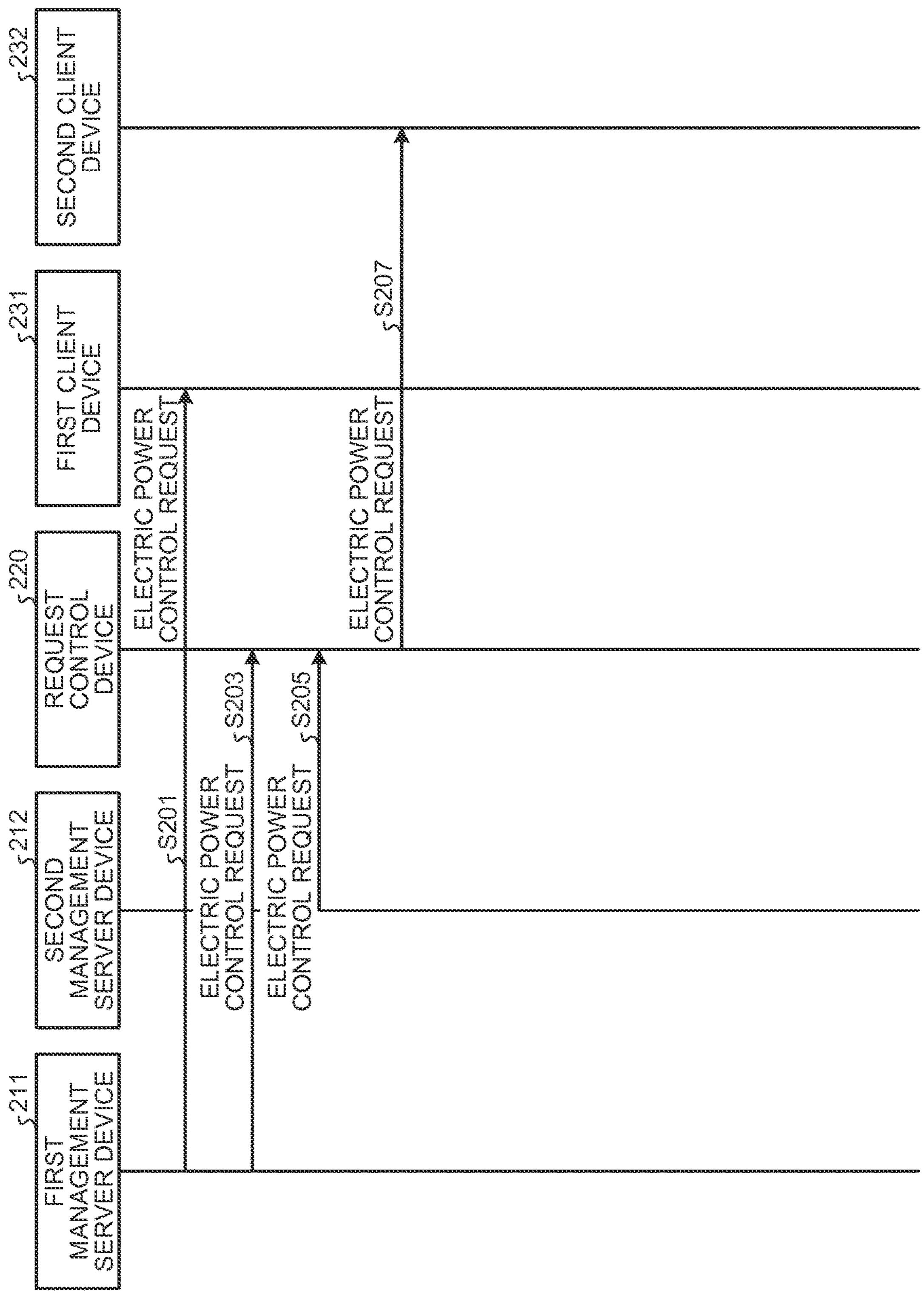
FIG. 8 is a sequence diagram illustrating an example of operations performed in the electric power control system according to the second embodiment.

FIG. 8 is a sequence diagram illustrating an example of operations performed in the electric power control system 200 according to the second embodiment.

Firstly, in the utility that operates the first management server device 211, when a condition for sending electric power control requests is satisfied, the first management server device 211 sends an electric power control request to the first client device 231 and the request control device 220 (Steps S201 and S203).

Upon receiving the electric power control request from the first management server device 211, the first client device 231 controls the first power receiving facility 31 according to that electric power control request.

The receiving unit 121 of the request control device 220 receives the electric power control request from the first management server device 211, and either newly stores that electric power control request in the request storing unit 123 or updates an electric power control request stored in the request storing unit 123 with the electric power control request that is received.

Then, in the utility that operates the second management server device 212, when a condition for sending electric power control requests is satisfied, the second management server device 212 sends an electric power control request to the request control device 220 (Step S205).

The receiving unit 121 of the request control device 220 receives the electric power control request from the second management server device 212, and either newly stores that electric power control request in the request storing unit 123 or updates an electric power control request stored in the request storing unit 123 with the electric power control request that is received.

Subsequently, at the timing for generating a new electric power control request, the generating unit 224 of the request control device 220 generates a new electric power control request by merging the electric power control request that is stored in the request storing unit 123 after being sent from the first management server device 211 with the electric power control request that is stored in the request storing unit 123 after being sent from the second management server device 212.

Then, the sending unit 125 of the request control device 220 sends the electric power control request, which is newly generated for the second client device 232, to the second client device 232 (Step S207).

Upon receiving the new electric power control device from the request control device 220, the second client device 232 controls the second power receiving facility 32 according to the new electric power control request that is received.

In this way, in the second embodiment, when a power receiving facility operated by an electricity consumer receives distribution of electric power from a plurality of utilities, the request control device 220 receives an electric power control request from the management server device operated by each utility, and generates a new electric power control request by merging the electric power control requests that are received. For example, according to the second embodiment, while fulfilling the electric power control requests that are received, the request control device 220 can select a portion (such as the electric power charge or the electric power usage) that is beneficial to the electricity consumer from among the electric power control requests that are received and can generate such an electric power control request that maximizes the gain of the electricity consumer. Thus, it becomes possible to reduce the adverse effect occurring on the electric power receiving side due to controlling the electric power usage.

Meanwhile, when a power receiving facility operated by an electricity consumer is receiving distribution of electric power from a plurality of utilities, the management server devices that send electric power control requests to that power receiving facility (the request control device 220) are not aware about the types of electric power control requests sent by the other management server devices.

In this way, in the second embodiment, it is possible to use electric power control requests, the contents of each of which are not known to other management server devices other than the management server device which sent that electric power control request. For that reason, the request control device 220 can generate a new electric power control request that enables achieving reduction in the adverse effect occurring on the receiving side of electric power.

Second Modification

Meanwhile, the request control device 220 can be configured to generate a new electric power control request also using feature information. That is, the first embodiment and the second embodiment can be combined together.

For example, with respect to the electric power control request obtained by means of merging, the request control device 220 can take into account a feature (the function list, the scheduled electric power usage, the device configuration in the power receiving facilities of the electricity consumer and the degree of importance of each device, or the target upper limit of the total electric power charge of the electricity consumer during a particular period of time) of the electric power usage of the power receiving facilities of the electricity consumer that operates the request control device 220, and can accordingly generate a new electric power control request.

Third Embodiment

In a third embodiment, the explanation is given about an example in which a plurality of electric power control requests is generated from a single electric power control request. The following explanation is given with the focus on the differences with the first embodiment; and the constituent elements having identical functionality to the first embodiment are referred to by the same names/reference numerals as in the first embodiment. Moreover, the explanation of such constituent elements is not repeated.

Firstly, an electric power system according to the third embodiment has an identical configuration to that described in the first embodiment. Hence, that explanation is not repeated.

Figure 9:
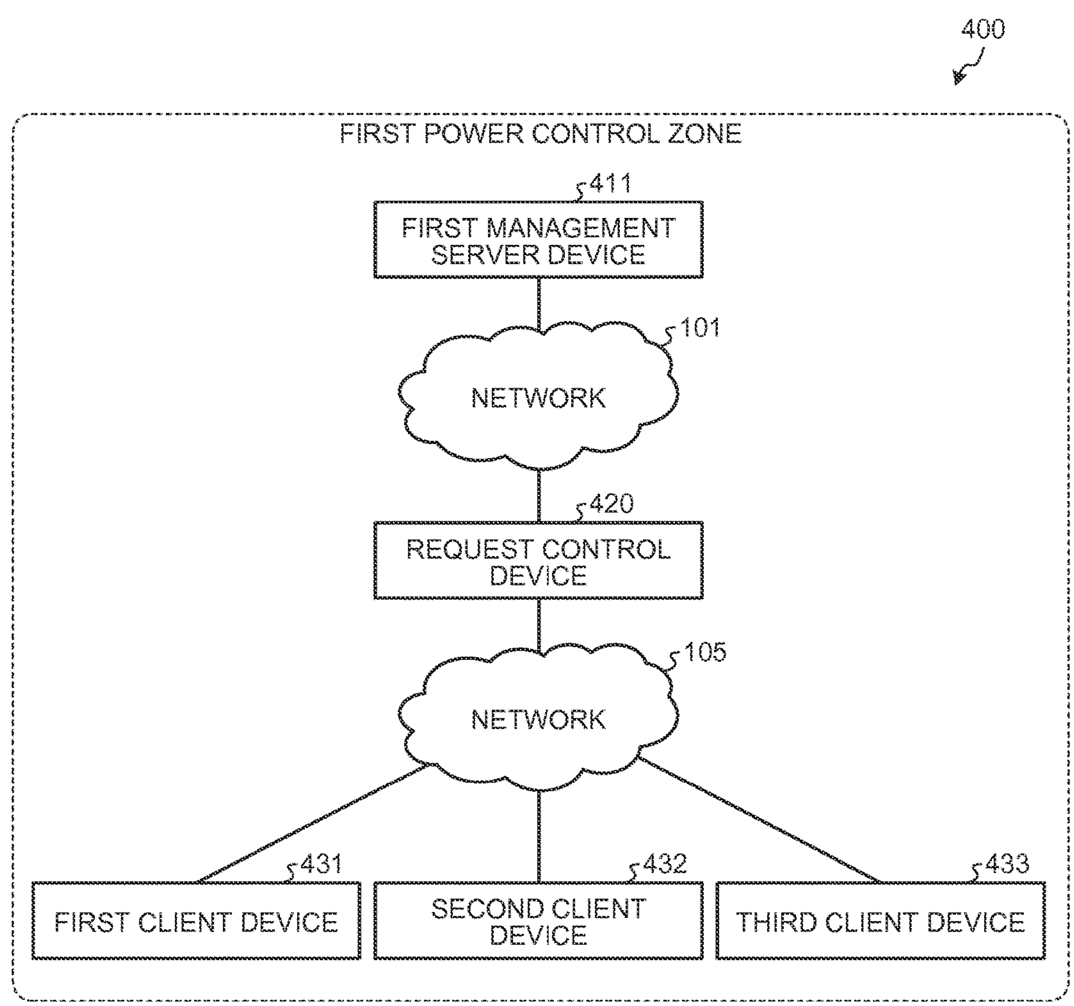
FIG. 9 is a diagram illustrating an exemplary configuration of an electric power control system according to a third embodiment.

FIG. 9 is a diagram illustrating an exemplary configuration of an electric power control system 400 according to the third embodiment. In the example illustrated in FIG. 9, a configuration in the first power control zone is illustrated as the electric power control system 400, and the configuration in other power control zones is not illustrated. However, the configuration in other power control zones can be of the same type as the configuration in the first power control zone.

As illustrated in FIG. 9, the electric power control system 400 includes a first management server device 411, a request control device 420, a first client device 431, a second client device 432, and a third client device 433.

The first management server device 411 and the request control device 420 are connected to each other via the network 101. Moreover, the request control device 420, the first client device 431, the second client device 432, and the third client device 433 are connected to each other via a network 105.

The networks 101 and 105 can be implemented using, for example, the Internet or a local area network (LAN). Moreover, the networks 101 and 105 can be identical to each other or can be different from each other.

The first management server device 411 manages the supply of electric power in the first power control zone. In the third embodiment, it is assumed that the first management server device 411 is operated by the utility that also operates the first electric power facility 11 to the third electric power facility 13 (see FIG. 1).

The request control device 420 manages the supply of electric power in the first power control zone, and is a client of the first management server device 411. In the third embodiment, it is assumed that the request control device 420 is operated by the utility that also operates the electric grids 4 and 5 (see FIG. 1). However, the utility that operates the request control device 420 need not operate only the electric grids 4 and 5 but can also operate the first electric substation facility 21 to the fourth electric substation facility 24 and the medium-voltage power grids 2 and 3. As far as the high-voltage power grid 1 is concerned, either the utility operating the first management server device 411 and the utility operating the request control device 420 can operate the high-voltage power grid 1 in collaboration with each other or any one of the first management server device 411 and the utility operating the request control device 420 can operate the high-voltage power grid 1.

The first client device 431 is a client of the request control device 420, and is assumed to be installed in the first power receiving facility 31 (see FIG. 1). However, that is not the only possible case. The second client device 432 is a client of the request control device 420, and is assumed to be installed in the second power receiving facility 32 (see FIG. 1). However, that is not the only possible case. The third client device 433 is a client of the request control device 420, and is assumed to be installed in the third power receiving facility 33 (see FIG. 1). However, that is not the only possible case.

The first management server device 411 sends electric power control requests to the request control device 420 via the network 101. Moreover particularly, when the electric-generating capacity (the maximum amount of available electric energy) that is guaranteed in the first electric power facility 11 to the third electric power facility 13 falls below a threshold value, the first management server device 411 sends an electric power control request to the request control device 420. For example, assume that the electric-generating capacity of 3000 kWh is guaranteed in the first electric power facility 11 to the third electric power facility 13; and assume that the third electric power facility 13 is stopped due to a trouble or for maintenance, thereby making the maximum electric energy of the first electric power facility 11 and the second electric power facility 12 equal to 2500 kWh which falls below 3000 kWh. In this case, the first management server device 411 sends to the request control device 420 an electric power control request for setting the maximum amount of available electric energy to 2500 kWh.

Upon receiving the electric power control request from the first management server device 411, the request control device 420 generates a plurality of electric power control request from the single electric power control request that is received. Then, the request control device 420 sends the electric power control requests that are generated to the first client device 431 to the third client device 433 via the network 105. Meanwhile, the electric power control requests sent by the request control device 420 may have the same contents as the contents of the electric power control request received by the request control device 420.

Each of the first client device 431 to the third client device 433 receives an electric power control request from the request control device 420, and performs electric power control, such as controlling the operating state of the devices that use electric power in the power receiving facilities, according to the corresponding electric power control request.

Figure 10:
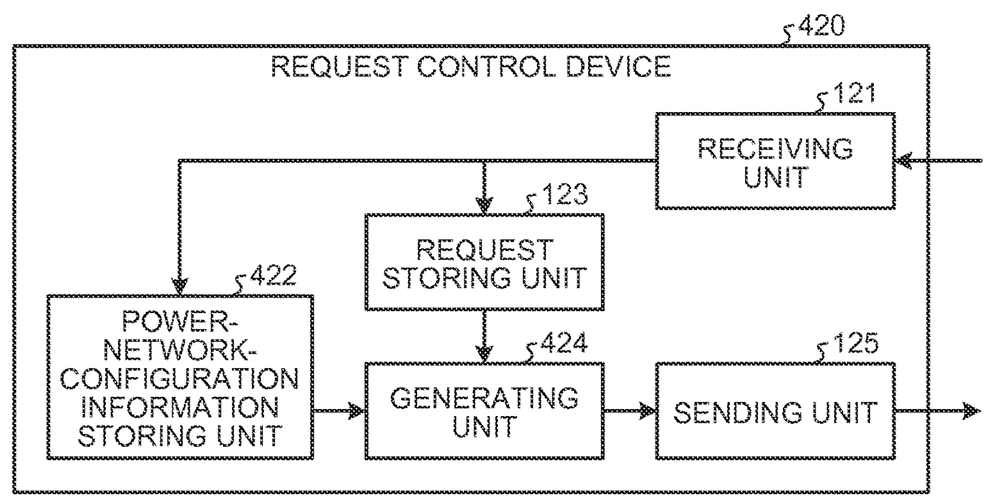
FIG. 10 is a diagram illustrating an exemplary configuration of a request control device according to the third embodiment.

FIG. 10 is a diagram illustrating an exemplary configuration of the request control device 420 according to the third embodiment. As illustrated in FIG. 10, the request control device 420 newly includes a power-network-configuration information storing unit 422; while a generating unit 424 in the request control device 420 is different than the first embodiment.

The receiving unit 121 receives electric power control requests. In the third embodiment, the receiving unit 121 receives electric power control requests from the first management server device 411.

The power-network-configuration information storing unit 422 is used to store power network configuration information, which is the information related to the power network between the request control device 420 and the first client device 431 to the third client device 433, which are the destinations for sending the electric power control requests generated by the request control device 420. More particularly, the power-network-configuration information storing unit 422 is used to store the power network configuration information that indicates the configuration of the electric grids 4 and 5 which are operated by the utility that also operates the request control device 420.

Figure 11:
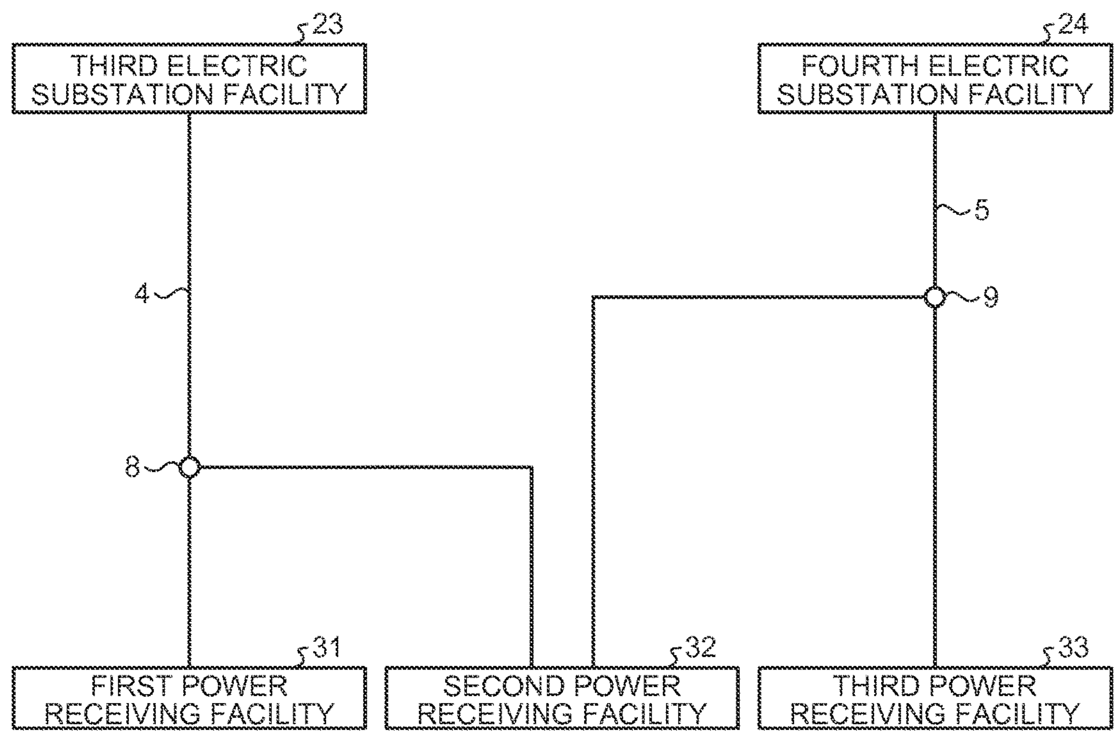
FIG. 11 is a diagram illustrating an example of power network configuration information according to the third embodiment.

FIG. 11 is a diagram illustrating an example of the power network configuration information according to the third embodiment. As illustrated in FIG. 11, the configuration of the electric grids 4 and 5 is expressed in the form of a graph in which the third electric substation facility 23, the fourth electric substation facility 24, the first power receiving facility 31, the second power receiving facility 32, the third power receiving facility 33, a transformer 8, and a transformer 9 serve as nodes; and in which power distribution lines serve as edges.

In practice, in the power grid configuration information, the contents of such a graph are expressed in the form of an adjacency matrix. In such information, a node contains the following: a node type indicating whether the node represents the third electric substation facility 23, the fourth electric substation facility 24, the first power receiving facility 31, the second power receiving facility 32, the third power receiving facility 33, the transformer 8, or the transformer 9; a node capacity indicating the maximum permissible current and the voltage handled; and an edge capacity.

The generating unit 424 generates a new electric power control request by referring to the power network configuration information stored in the power-network-configuration information storing unit 422 and the electric power control requests stored in the request storing unit 123.

For example, when the "type" of an electric power control request stored in the request storing unit 123 indicates the maximum amount of available electric energy, the generating unit 424 calculates, for each electric grid (power distribution line), an electric rate structure in accordance with the maximum amount of available electric energy, and accordingly generates a new electric power control request.

Herein, assume that X(t) represents the maximum amount of available electric energy at the timing t; $g_4(t, p_4)$ represents the scheduled electric power usage at the timing t and at an electric power charge p in the power receiving facilities that receive distribution of electric power from the electric grid 4; and $g_5(t, p_5)$ represents the scheduled electric power usage at the timing t and at an electric power charge p in the power receiving facilities that receive distribution of electric power from the electric grid 5. In that case, the maximum amount of available electric energy X(t) can be identified based on the electric power control request; while the scheduled electric power usage $g_4(t, p_4)$ and the scheduled electric power usage $g_5(t, p_5)$ can be identified based on a predicted value (such as a baseline) that is derived from the power network configuration information and the past usage record. Then, such $p_4$ and $p_5$ are obtained that satisfy Expression (9).

$$X(t)>g_4(t,p_4)+g_5(t,p_5) \tag{9}$$

Herein, it is desirable that $p_4$ and $p_5$ satisfying Expression (9) are $p_4'(t)$ and $p_5'(t)$ that minimize the total electric power charge $p_4g_4(t, p_4)+p_5g_5(t, p_5)$.

With that, for each electric grid, such an electric rate structure is obtained that has the minimum electric power charge ($p_4'(t)$, $p_5'(t)$: $t=t_1, t_2, \ldots$ ) in each time slot. As a result, the generating unit 424 generates a new electric power control request including that electric rate structure.

For example, as an electric power control request meant for the electric grid 4, the generating unit 424 generates a new electric power control request including the electric rate structure configured with $p_4'(t)$. Similarly, as an electric power control request meant for the electric grid 5, the generating unit 424 generates a new electric power control request including the electric rate structure configured with $p_5'(t)$.

Meanwhile, in the example given above, instead of calculating the electric rate structure for each electric grid, the generating unit 424 can calculate a single electric rate structure corresponding to the maximum electric energy and accordingly generate a new electric power control request. In that case, since the power network configuration information becomes redundant, the request control device 420 may not include the power-network-configuration information storing unit 422.

In this case, assume that t represents the timing, and g(t, p) represents the estimated electric power usage. Then, the minimum p that satisfies Expression (10) is assumed to be p'(t).

$$X(t)>g(t,p) \tag{10}$$

With that, such an electric rate structure is obtained that has the minimum electric power charge ($p'(t)$: $t=t_1, t_2, \ldots$ ) in each time slot. As a result, the generating unit 424 generates a new electric power control request including that electric rate structure.

The sending unit 125 sends the electric power control request that is newly generated by the generating unit 424. In the third embodiment, the sending unit 125 sends the electric power control request, which is newly generated by the generating unit 424, to the first client device 431 to the third client device 433. For example, when the generating unit 424 generates a new electric power control request for each electric grid; the sending unit 125 sends the electric power control request meant for the electric grid 4 to the first client device 431 and the second client device 432, and sends the electric power control request meant for the electric grid 5 to the second client device 432 and the third client device 433.

Figure 12:
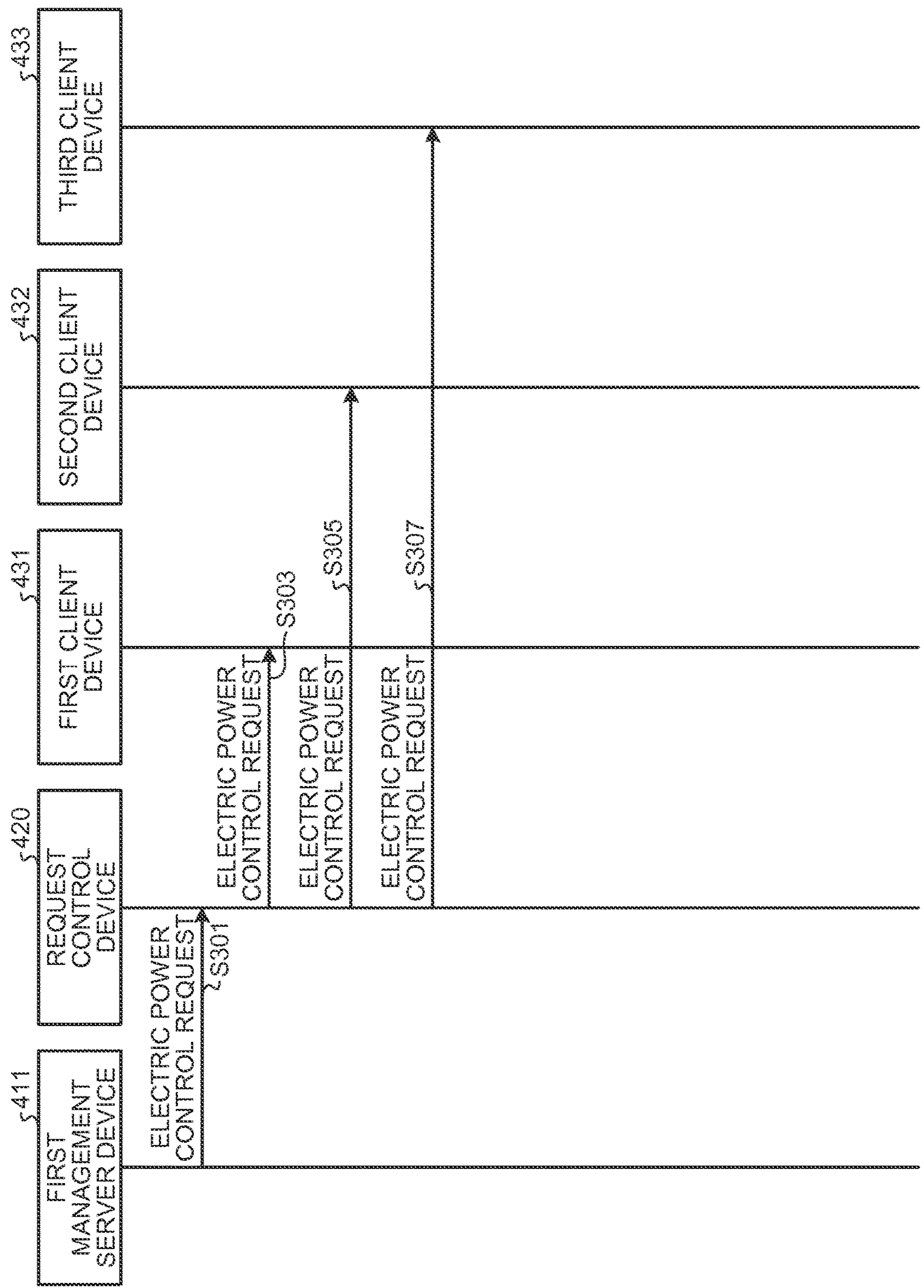
FIG. 12 is a sequence diagram illustrating an example of operations performed in the electric power control system according to the third embodiment.

FIG. 12 is a sequence diagram illustrating an example of operations performed in the electric power control system 400 according to the third embodiment.

Firstly, in the utility that operates the first management server device 411, when a condition for sending electric power control requests is satisfied, the first management server device 411 sends an electric power control request to the request control device 420 (Step S301).

The receiving unit 121 of the request control device 420 receives the electric power control request from the first management server device 411, and either newly stores that electric power control request in the request storing unit 123 or updates an electric power control request stored in the request storing unit 123 with the electric power control request that is received.

Then, at the timing for generating a new electric power control request, the generating unit 424 of the request control device 420 refers to the power network configuration information stored in the power-network-configuration information storing unit 422 and the electric power control requests stored in the request storing unit 123, and generates a new electric power control request for each electric grid.

Subsequently, the sending unit 125 of the request control device 420 sends the electric power control request meant for the electric grid 4 to the first client device 431 (Step S303); sends the electric power control requests meant for the electric grids 4 and 5 to the second client device 432 (Step S305); and sends the electric power control request meant for the electric grid 5 to the third client device 433 (Step S307).

Upon receiving the new electric power control request from the request control device 420, each of the first client device 431 to the third client device 433 controls the power receiving facility, in which it itself is installed, according to the new electric power control request that is received.

In this way, in the third embodiment, the utility (which distributes the electric power and) which is positioned in the midstream of the power network receives an electric power control request from a utility positioned in the upstream of the power network and generates a new electric power control request by taking into account the configuration of the electric grid. Thus, according to the third embodiment, the utility positioned in the midstream of the power network can generate an electric power control request by taking into account the actual condition of the electricity consumer. As a result, it becomes possible to reduce the adverse effect occurring on the electric power receiving side due to controlling the electric power usage. Besides, a utility positioned in the upstream of the power network can generate an electric power control request without taking into account the actual condition (of the electric grids or the like) on the downstream side thereof. As a result, it can be expected to achieve cost reduction.

Third Modification

In the third embodiment, in the case when a storage battery is connected to the upstream side of the transformer 8 and when electric power to the first power receiving facility 31 and the second power receiving facility 32 can be fed from the storage battery too, then the request control device 420 can calculate the electric power unit price by taking into account the power feeding amount of the storage battery.

In that case, assume that K(t) represents the power feeding amount of the storage battery and $p_K$ represents the power feeding cost of the storage battery, and the generating unit 424 calculates the electric power unit price under the assumption that the first power receiving facility 31 and the second power receiving facility 32 can receive the power feed from the storage battery. The electric power unit price can be calculated using, for example, Expressions (11) and (12).

$$X(t)>g_4(t,p_4)+g_5(t,p_5)-K(t) \text{ if } g_5(t,p_5)>K(t) \quad (11)$$

$$X(t)>g_4(t,p_4) \text{ if } g_5(t,p_5)<K(t) \quad (12)$$

Fourth Modification

In the third embodiment, the explanation is given for an example in which the utility positioned in the midstream of the power network operates the request control device 420. However, alternatively, an electricity consumer can also operate the request control device 420. For example, the management company of a high-rise condominium can operate the request control device 420, and the first power receiving facility 31 to the third power receiving facility 33 can be considered as rooms of the high-rise condominium.

In the case when the request control device 420 is operated by an electricity consumer, the request control device 420 can be configured to generate a new electric power control request also using the feature information. That is, the first embodiment and the third embodiment can be combined together. In this case, it is desirable that the feature information contains electric grid identification information that enables identification of the electric grids (the power distribution lines).

For example, with respect to a plurality of newly-generated electric power control requests, the request control device 420 can take into account a feature (the function list, the scheduled electric power usage, the device configuration in the power receiving facilities of the electricity consumer and the degree of importance of each device, or the target upper limit of the total electric power charge of the electricity consumer during a particular period of time) of the electric power usage of the power receiving facilities of the electricity consumer that operates the request control device 420, and can accordingly generate a new electric power control request.

Moreover, in the case when the request control device 420 is operated by an electricity consumer, the request control device 420 can be configured to receive an electric power control request from a plurality of management server devices, to merge the received electric power control requests into a single electric power control request, and to newly generate a plurality of electric power control requests from the single electric power control request obtained by means of merging. That is, the second embodiment and the third embodiment can be combined together.

Hardware Configuration

Figure 13:
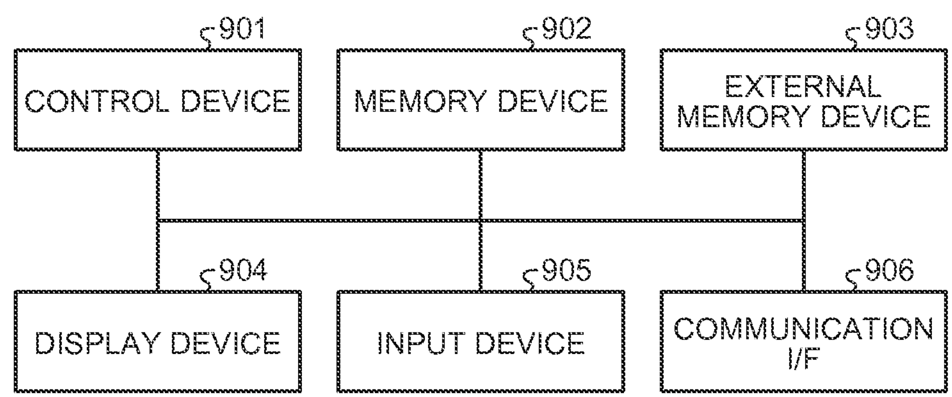
FIG. 13 is a diagram illustrating an exemplary hardware configuration of the request control device according to the embodiments and modifications.

FIG. 13 is a diagram illustrating an exemplary hardware configuration of the request control device according to the embodiments and the modifications described above. The request control device according to the embodiments and the modifications described above has the hardware configuration of a commonly-used computer that includes a control device 901 such as a central processing unit (CPU), a memory device 902 such as a read only memory (ROM) or a random access memory (RAM), an external memory device 903 such as a hard disk drive (HDD), a display device 904 such as a touch-sensitive panel, an input device 905 such as a touch-sensitive panel, and a communication device 906 such as a communication interface.

The computer programs executed in the request control device according to the embodiments and the modifications described above are recorded in the form of installable or executable files in a computer-readable recording medium such as a compact disk read only memory (CD-ROM), a compact disk readable (CD-R), a memory card, a digital versatile disk (DVD), or a flexible disk (FD).

Alternatively, the computer programs executed in the request control device according to the embodiments and the modifications described above can be saved as downloadable files on a computer connected to the Internet or can be made available for distribution through a network such as the Internet. Still alternatively, the computer programs executed in the request control device according to the embodiments and the modifications described above can be distributed over a network such as the Internet. Still alternatively, the computer programs executed in the request control device according to the embodiments and the modifications described above can be stored in advance in a ROM or the like.

Meanwhile, the computer programs executed in the request control device according to the embodiments and the modifications described above contain a module for each of the abovementioned constituent elements to be implemented in a computer. In practice, for example, a CPU reads a computer program from an HDD and runs it such that the computer program is loaded in a RAM. As a result, the module for each of the abovementioned constituent elements is generated in the computer.

For example, unless contrary to the nature thereof, the steps of the flowcharts according to the embodiments described above can have a different execution sequence, can be executed in plurality at the same time, or can be executed in a different sequence every time.

Thus, according to the embodiments and the modifications described above, it becomes possible to reduce the adverse effect occurring on the electric power receiving side due to controlling the electric power usage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A request control device connectable with a client device, comprising:

a memory; and a hardware processor configured to perform operations comprising:

receiving a first electric power control request for controlling electric power usage from the client device;

generating a second electric power control request, which is different from the first electric power control request, at least using the first electric power control request; and sending the second electric power control request to the client device, wherein the memory is configured to store therein feature information related to a feature of electric power usage at the client device, and the processor is configured to calculate an electric power usage allowance in the client device and to generate the second electric power control request, using the feature information and the first electric power control request, so that a gain of an electric power consumer is maximized.

2. The device according to claim 1, wherein the processor is configured to perform further operations comprising:

receiving a plurality of first electric power control requests generated by different generation sources, and generating the second electric power control request using the plurality of first electric power control requests.

3. The device according to claim 1, wherein the memory further stores therein power network information related to a power network between the request control device and the client device, and the processor is configured to perform further operations comprising generating the second electric power control request further using the power network information.

4. A request control method comprising:

receiving a first electric power control request for controlling electric power usage from a client device;

generating a second electric power control request, which is different from the first electric power control request, at least using the first electric power control request; and sending the second electric power control request to the client device, wherein the generating includes calculating an electric power usage allowance in the client device and generating the second electric power control request, using feature information and the first electric power control request, so that a gain of an electric power consumer is maximized, and the feature information is information related to a feature of electric power usage at the client device.

5. A computer program product comprising a non-transitory computer-readable medium containing a computer program, wherein the program, when executed by a computer, causes the computer to perform operations comprising:

receiving a first electric power control request for controlling electric power usage from a client device;

generating a second electric power control request, which is different from the first electric power control request, at least using the first electric power control request; and sending the second electric power control request to the client device, wherein the generating includes calculating an electric power usage allowance in the client device and generating the second electric power control request, using feature information and the first electric power control request, so that a gain of an electric power consumer is maximized, and the feature information is information related to a feature of electric power usage at the client device.

* * * * *